United States Patent [19]

Kuehn et al.

[11] Patent Number: 4,776,666
[45] Date of Patent: Oct. 11, 1988

[54] PROJECTOR FOR PROJECTING FIXED STAR

[75] Inventors: Gebhard Kuehn; Klaus-Dieter Scharf; Juergen Pudenz, all of Jena-Lobeda; Ludwig Meier, Jena, all of German Democratic Rep.

[73] Assignee: Jenoptik Jena G.m.b.H., Jena, German Democratic Rep.

[21] Appl. No.: 10,376

[22] Filed: Feb. 3, 1987

[30] Foreign Application Priority Data

Feb. 3, 1986 [DD] German Democratic Rep. ... 286697

[51] Int. Cl.⁴ .................................................. G02B 6/04
[52] U.S. Cl. ................................ 350/96.24; 350/96.1; 434/286
[58] Field of Search .......................... 434/285, 286; 350/96.10, 96.16, 96.18, 96.24

[56] References Cited

U.S. PATENT DOCUMENTS

| | | | |
|---|---|---|---|
| 3,470,629 | 10/1969 | Kittredge et al. | 434/286 |
| 3,525,332 | 8/1970 | Kosaka | 350/96.24 X |
| 3,874,781 | 4/1975 | Thiel | 350/96.16 |
| 4,411,490 | 10/1983 | Daniel | 350/96.24 X |
| 4,483,585 | 11/1984 | Takami | 350/96.24 |
| 4,511,755 | 4/1985 | Mori | 350/96.24 X |
| 4,588,384 | 5/1986 | Shiba | 434/286 |

*Primary Examiner*—John Lee
*Assistant Examiner*—John Ngo
*Attorney, Agent, or Firm*—Jordan and Hamburg

[57] ABSTRACT

An improved projector for projecting fixed stars in planetaria increases the brightness and the brilliance of the projected sky by using fiber optical light guides. The device comprises at least one light source, one condenser, one star plate or templates and one lens, which projects the star plate template on the planetarium dome. A fiber optical light guide cable, the light-entry end of which faces the condenser and which consists of fiber optical light guides or fiber optical light guide bundles, is provided between the condenser and the associated star plate or template. The other end of the fiber optical light guide cable is split up into fiber optical light guides and/or fiber optical light guide bundles, the light-emergence ends of which are assigned to the locations on the star plate or template which are to be illuminated.

13 Claims, 2 Drawing Sheets

PROJECTOR FOR PROJECTING FIXED STAR

BACKGROUND OF THE INVENTION AND PRIOR ART STATEMENT

The invention relates to a projector for projecting fixed stars, preferably for use in planetaria.

In all existing planetaria, the brightness of the starry sky shown is a crucial and central problem. To achieve a natural impression of the sky, it is necessary to portray very small disks as brightly as possible at the dome. The full sphere of the projector must be illuminated with this projection, although the ratio of the area of the actually bright regions to the area of the full sphere is about 1 to $10^5$.

From the book by Letsch, "Das Zeiss-Planetarium" (The Zeiss Planetarium), Gustav Fischer Verlag, Jena, 1955, the reprint "Bild der Wissenschaft" (Picture of Science), Deutsche Verlagsgesellschaft Stuttgart, 1977, and "Jenaer Rundschau" (1967), 3, pages 177 to 181 and (1968), 6, pages 345 to 349, those involved with the construction of planetaria know that, for the projection of fixed stars, projectors may be provided on hollow spheres.

A light source, disposed centrally in each hollow sphere, supplies all projectors with light. Each projector is provided with a transparency, the pictorial content of which comprises small, transparent areas in absorbing material corresponding to the stars of the star field in question, which are to be projected. These transparencies generally are each illuminated from a central light source through respective condensers each associated with a respective one of the transparencies and the light passing through each transparency is projected by a respective lens on to the inside of the dome.

Generally, all projections, in which, because of the pictorial content of the transparency, only a small proportion of the light is used for the imaging, as is the case with most of the projected objects in planetaria, have the disadvantage that the bulk of the light, produced by the light source, is finally converted into unwanted heat. To improve the brilliance and brightness of the images of the stars, it was necessary to increase the output of the light source, which, on the other hand, increased the amount of heat developed.

Individual projection systems, some with their own light sources, are also used in various planetaria to portray the brightest stars. The attempt has also been made to project a computer-generated image of the sky of a cathode ray tube through over a fish eye optical system on to the dome. The sky, so projected, is however of very low luminosity.

With the help of the resonator construction which is described in the DD Pat. No. 153,933 and in which the light that is not used for the projection is always returned again to the lens (transparency) by multiple reflections, the utilization of the light is admittedly already clearly better than that achieved with the above-described devices, but does not reach the theoretically possible maximum level and essentially assumes the use of small light sources of high light density. The manufacture of the resonators is technologically very sophisticated and these resonators require relatively much space within the projectors.

From the DD Pat. No. 154,921, a device for projecting stars is known in which several projectors are provided on a sphere or a polyhedron in mountings about a centrally disposed light source. To reduce light losses, the projectors are disposed as close to one another as possible. With this device also, only a small portion of the light emanating from the light source is utilized for the actual projection of the stars.

It is the object of the invention to eliminate the disadvantages of the state of the art and to increase the light utilization for projections in planetaria.

The invention is based on the task of providing a projector for projecting fixed stars, with which an increase in brightness, an increase in the brilliance of the image and a decrease in the amount of heat transferred to the instrument is achieved by using fiber optical light guides in fixed star projectors.

SUMMARY OF THE INVENTION

In accordance with the invention, the objective for a projector for projecting fixed stars, comprising in one housing one or several light sources, one or several condensers, which image the lamp filament of the light sources and which are arranged in a spatially compact fashion about the light source and each illuminate a star plate or a star template, and one or several lenses, which project the star plates or templates onto the inner surface of the planetarium dome, each condenser being followed in the direction of the light by a lens, is accomplished owing to the fact that, between each condenser and the associated star plate or template at least one fiber optical cable, comprising fiber optical light guides or fiber optical light guide bundles, is provided, the light-entry opening, i.e., end, of which faces the respective condenser and the end of which, facing away from the condenser, is split up preferably into several fiber optical light guide bundles and/or fiber optical light guides, the light-outlet openings, i.e., ends, of which are assigned to the places or openings of the star plate or the star template which are to be illuminated.

In this connection, it is advantageous that in each case one light mixing rod, which the known per se, is disposed between the condensers and the optical light guide cable, the light-emergence surface, i.e., end, of the light mixing rod preferably being connected with the light-entry surface, i.e., end, of the optical light guide cable.

Furthermore, it is advantageous that the star plates or templates be adjustably connected in each case with at least one support plate and that the star plates or templates and the support plate be provided with boreholes of appropriate diameter representing the stars to be projected, the ends of the fiber optical light guides or fiber optical light guide bundles comprising the light-emergence surfaces, i.e., ends, being disposed positively i.e., fastened, in the boreholes of the support plate.

It is furthermore advantageous that means for attenuating the light be provided on the light-emergence openings of the fiber optical light guides or fiber optical light guide bundles or in the fiber optical light guides or guide bundles themselves.

In accordance with one embodiment, it is advantageous that a condensing lens be disposed between the star plate or template and the lens and the axes of the boreholes in the support plate be parallel to the optical axis of the respective illuminating light path.

A further embodiment consists therein that the support plate has a plane or a plano-convex shape, the convex surface facing the light source and the axes of the boreholes in the support plate being directed to a point lying in the lens.

In order to direct all the light, emerging from the fiber optical light guides or the fiber optical light guide bundles, to the lens, it is advantageous that the light-emergence surfaces of the fiber optical light guides or the fiber optical light guide bundles form an angle $\beta$ with a line perpendicular to the axis of the fiber optical light guides or the fiber optical light guide bundles in such a way, that the beam of rays emerges at an angle $\alpha$ to the axis of the fibers or fiber bundles, the relationship of the angles $\alpha$ and $\beta$ being defined by the equation $$\alpha = \arcsin\left(\frac{n_1}{n_2} \sin \beta\right) - \beta$$

in which $n_1$ is the refractive index of the fiber optical light guide core and $n_2 = 1$.

It is furthermore advantageous that the star plates or templates be connected positively with a support having in each case several identical support plates, spaced one behind the other with boreholes parallel to the optical axis.

To avoid having to produce the boreholes in the support plates according to spherical coordinates, it is advantageous that the star plates or templates be connected with a support which comprises several support plates which are spaced one behind the other and in each of which the the boreholes are positioned differently from the others.

To portray star scintillations, it is advantageous to dispose a partially movable diaphragm directly in front of the inlet surface of the fiber optical light guide cable.

When using the apparatus of the invention for the projection of fixed stars in planetaria, a better utilization of the light emitted by the light source is achieved owing to the fact that almost the whole of the radiation is utilized for the illumination and concentrated on the individual objects of small dimensions and the illumination of areas outside of these actual objects is thus basically avoided. Furthermore, the brightness and brilliance of the star disks projected on the inner surface of the planetarium dome are improved appreciably relative to the known arrangements.

The invention will be explained in greater detail below by means of an example of the operation.

DETAILED DESCRIPTION OF THE PREFERRED EMBODIMENTS

Figure 1:
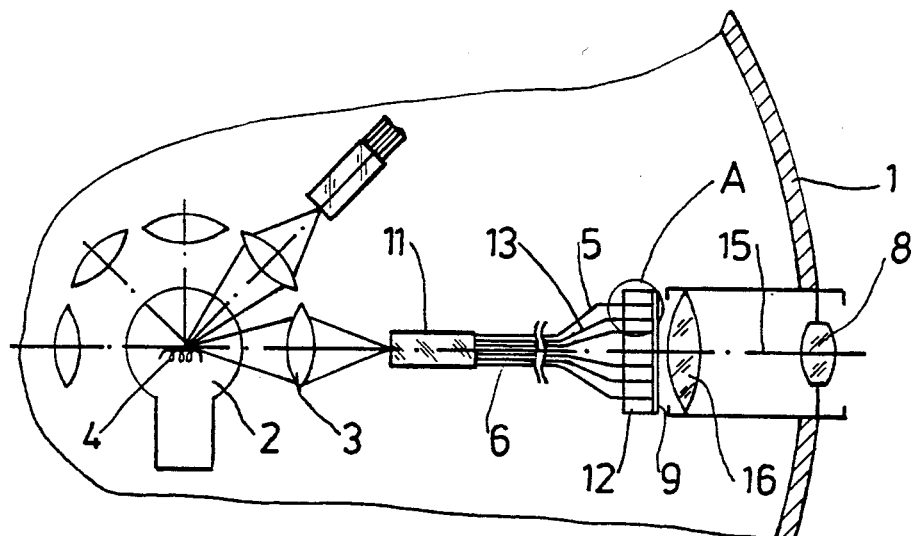
FIG. 1 schematically shows the construction of the projector.

The projector, shown in FIG. 1, comprises in a housing 1 one or several light sources 2 and one or several condensers 3, which image the lamp filament 4. The condensers 3 are so disposed in a spatially compact fashion around the light source 2 that, as far as possible, the whole of the light leaving the light source 2 passes through the condensers 3. In the interior of the housing 1, each of the condensers 3 is followed in the direction of the light by at least one fiber optical light guide cable, which comprises fiber optical light guide bundles or fiber optical light guides 5, the light-entry opening of which faces the respective condenser 3. The end of the fiber optical light guide cable 6, averted from the respective condenser 3, is split up into several fiber optical light guide bundles or fiber optical light guides 5, the light-emergence opening of which are connected with the places or openings of a star plate or a star template 10 (FIG. 2) mounted on a glass plate 9, which are to be illuminated and projected on the inner surface of a planetarium dome (not shown). To assure that the illumination of the entry surfaces of the fiber optical light guide cable 6 is as homogeneous as possible, a light-mixing rod 11, which is known per se, is disposed in each case between the condensers 3 and the fiber optical light guide cable 6. In this connection, the light-emergence surface of the light mixing rod is advantageously closely connected with the light-entry surface of the fiber optical light guide cable 6.

Figure 2:
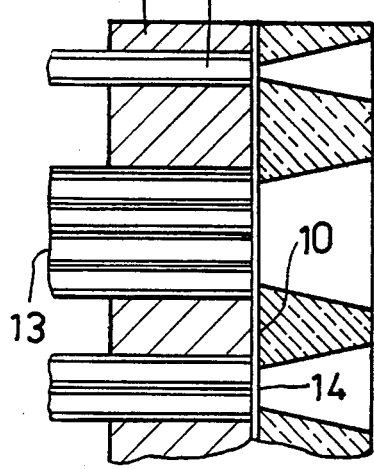
FIG. 2 is an enlargement of section A from FIG. 1.

The section A (FIG. 1), shown on a larger scale in FIG. 2, shows a support plate 12, which is connected with the star plate or with the glass plate 9 carrying the star template 10. Instead of the star template 10, a star plate or transparency, which is frequently used in planetaria and on which the stars to be projected are marked as holes or light-transparent regions, may be employed. The support plate 12 is supplied with boreholes, in which the ends of the fiber optical light guides 5 or fiber optical light guide bundles 13, comprising the light emergence surfaces, are positively fastened, for example, by cementing or gluing. The boreholes in the support plate 12 advantageously are of conical construction to facilitate the insertion of the fiber optical light guides 5 or the fiber optical light guide bundles 13, and the position of each in the support plate 12 correspond to the place of a star in the firmament. The the star plate or the star template 12 has light-transparent openings 14 with a diameter specified by the brightness of the star that is to be projected at the same positions as the boreholes of the support plate 12. While being assembled, support plate 12 and star template 10 are adjusted relative to one another and fixed relative to each other, for example, by gluing or cementing, in their adjusted position. From the emergence surfaces of the fiber optical light guides 5 or the fiber optical light guide bundles 13, the appropriate portion of light, corresponding to the diameters of the openings 14, is utilized for the projection through the light-transparent openings 14 of the star templates 10.

The light emerges from the individual fiber optical light guides 5 or fiber optical light guide bundles 13 essentially in the form of a cone, which corresponds to that on entry into the fiber optical light guides 5 or fiber optical light guide bundles 13. If the fiber optical light guides 5 or the fiber optical light guide bundles 13 are inserted in the support plate 12 parallel to the optical axis 15 and the light emergence surface is perpendicular to the optical axis 15 of the respective illuminating light path, a condensing lens 16 is provided (FIG. 1), which directs the light to the lens 8 that follows.

Figure 3:
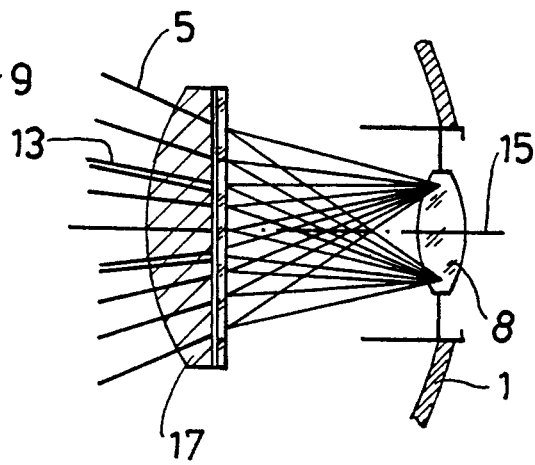
FIG. 3 schematically shows a plano-convex support plate.

The support plate 17, shown in FIG. 3, has, for example, a plano-convex shape, the convex surfaces of which faces the light source 2. (The light source has not been shown in FIG. 3.)

The boreholes in the support plate 17, in which the fiber optical light guides 5 or the fiber optical light guide bundles 13 are inserted, are disposed so that their axes intersect at a point in the lens 8. By these means, it is possible to do without the use of a condensing lens.

Figure 4:
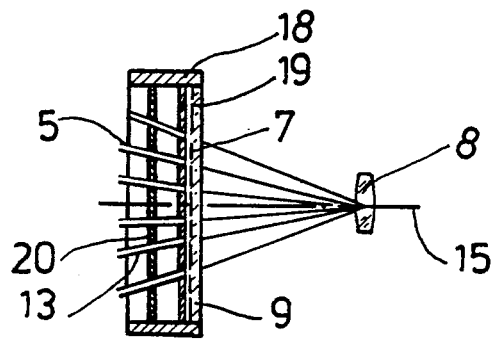
FIG. 4 schematically shows the arrangement of several support plates.

In FIG. 4, a support 18 is shown, which comprises two support plates 19 and 20 and which is connected with the star plate 7 on the glass plate 9. The support plates 19 and 20 are spaced one behind the other and have boreholes for accommodating fiber optical light guides or fiber optical light guide bundles 13, the position of which is different on the individual support plates 19 and 20, so as to effect the inclination of the ends of the fiber optical light guides 5 or fiber optical light guide bundles 13, described in connection with FIG. 3, and the boreholes need not be produced according to spherical coordinates. As shown in FIG. 4, the axes of the fiber optical light guides 5 are so aligned, that they converge in the lens 8.

Figure 6:
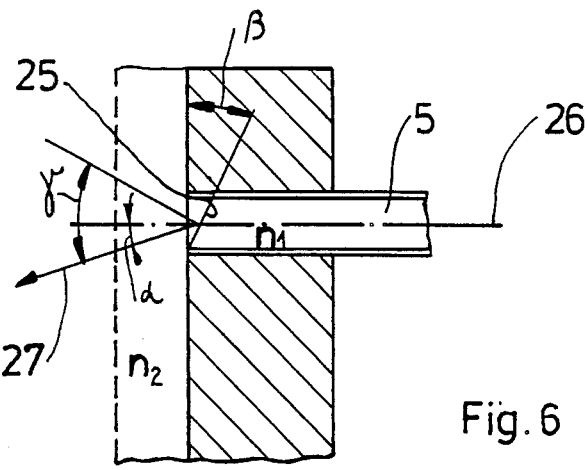
FIG. 6 schematically shows a fiber optical light guide with an angular light-emergence surface.
Figure 5:
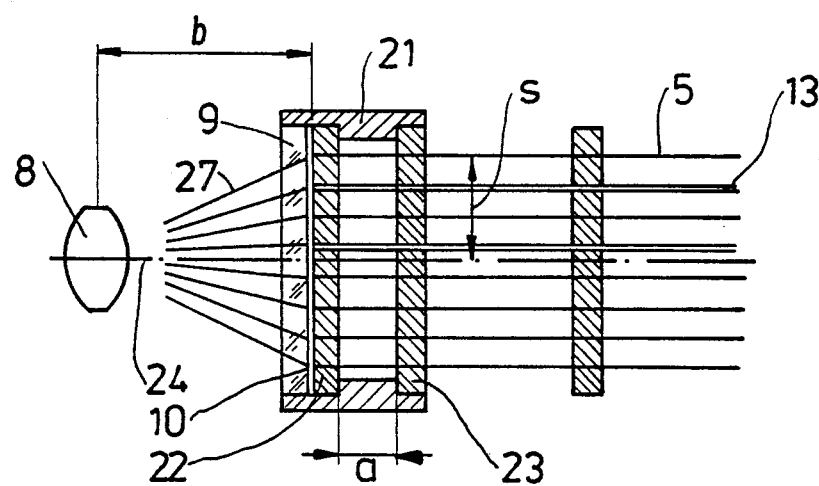
FIG. 5 shows an arrangement with several identical support plates in each of which the boreholes are positioned differently from the others.

In the arrangement shown in FIG. 5, two identical support plates 22 and 23 are disposed in one support 21 a distance "a" apart one behind the other in a support 21. The support 21 is connected with the star template 10 disposed on a glass plate 9 (as in FIG. 2). The boreholes, in which the fiber optical light guides 5 and fiber optical light guide bundles 13 are positively fastened, run parallel to the optical axis 24. With a parallel arrangement of the fiber optical light guides 5, the light-emergence surfaces 25 of the fiber optical light guides 5 (FIG. 6) and fiber optical light guide bundles 13 form an angle $\beta$ with a line perpendicular to the axis 26 of the fiber optical light guides or the fiber optical light guide bundles so that the beam of rays 27 emerges at an angle $\alpha$ to the axis 26 of the fibers or fiber bundles, the relationship of the angles $\alpha$ and $\beta$ being defined by the equation $$\alpha = \arcsin\left(\frac{n_1}{n_2}\sin\beta\right) - \beta$$

in which $n_1$ is the refractive index of the core material of the fiber optical light guide 5 and $n_2=1$. The angle $\alpha$ moreover depends on the distance "s" of the fiber optical light guides from the optical axis 24 (FIG. 5) and on the distance "b" of the support plate 22 from the entrance pupil of the lens 8. Furthermore, $\alpha = \arctan s/b$. During the assembly, each of the fiber optical light guides 5 or fiber optical light guide bundles 13 is so adjusted by being twisted about its axis and glued or cemented in this position that the beams of rays 27, leaving the light-emergence surface 25, strike the objective 8.

Figure 7:
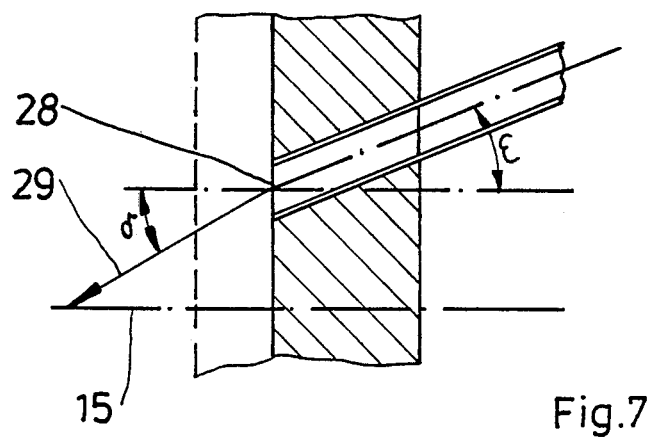
FIG. 7 schematically shows a support plate in which the fiber optical light guide is inserted at an angle.

FIG. 7 shows a fiber optical light guide 5, which is inserted in a support plate 19 (as in FIG. 4) at an angle $\epsilon$ to the optical axis 15 and the light-emergence surface of which is perpendicular to the optical axis 15. The beam of rays 29, leaving the fiber optical light guides 5, forms an angle $\delta$ with the optical axis 15. Because of the refraction of the light at the glass, $\epsilon < \delta$.

To achieve a brightness matching the brightness of the stars to be projected, means (not shown) are provided to attenuate the light at the light-emergence openings of the fiber optical light guides 5 or the fiber optical light guide bundles 13 or in the fiber optical light guides 5 or fiber optical light guide bundles 13 themselves. With such an arrangement, a star plate or a star template would be superfluous.

Scintillations of the projected stars at the planetarium dome can be realized by a partially movable diaphragm (not shown) directly in front of the inlet surface of the fiber optical light guide cable 6.

We claim:

1. In a fixed star projector for projecting fixed stars, comprising a housing, at least one light source disposed in said housing, a plurality of condensers compactly arranged about the light source in said housing, star plates or templates disposed, in the direction of the light, behind the condensers so that a respective star plate or template is associated with each respective condenser, respective projecting lenses disposed in the housing to project the star plates or templates on the inner surface of a planetarium dome, each said condenser being followed, in the direction of the light, by said star plate and said lens, the improvement wherein said star plate or template has at least a first hole of a first diameter and a second hole of a second diameter larger than said first diameter, said projector further comprising respective fiber optical light guide cables disposed between each said condenser and the associated said star plate or template, said fiber optical light guide cables each having a light-entry end which is adjacent to the associated condenser, said fiber optical light guide cables each having a light-emergence end which is adjacent to said star plate or template, said light-emergence end of the fiber optical light guide cable being split up into at least one optical light guide and at least one fiber optical light guide bundle of a plurality of light guides, the light-emergence ends of said light guide and light guide bundle being coupled to said first and second holes respectively whereby a greater intensity of light is projected from said second hole than from said first hole.

2. Projector of claim 1, wherein a respective light mixing rod is disposed between each of the condensers and the respective optical light guide cable.

3. Projector of claim 2, wherein the light mixing rod has a light-emergence end, said light-emergence end of said light mixing rod being connected with the light-entry end of the respective light guide cable.

4. Projector of claim 1, wherein means for attenuating the light are provided on the light-emergence ends of the fiber optical light guides or fiber optical light guide bundles.

5. Projector of claim 1, wherein a condensing lens is disposed between the star plate or template and the lens and the axes of the boreholes in the support plate are parallel to the optical axis of the respective illuminating light path.

6. Projector of claim 1, wherein the support plate has a plane shape and the axis of the boreholes in the support plate is directed to a point lying in the lens.

7. Projector of claim 1, wherein the light-emergence ends of the fiber optical light guides or the fiber optical light guide bundles form an angle $\beta$ with a line perpendicular to the axis of the fiber optical light guides or the fiber optical light guide bundles so that the beam of rays emerges at an angle $\alpha$ to the axis of the fibers or fiber bundles, the relationship of the angles $\alpha$ and $\beta$ being defined by the equation $$\alpha = \arcsin\left(\frac{n_1}{n_2}\sin\beta\right) - \beta$$

in which $n_1$ is the refractive index of the core material of the fiber optical light guide and $n_2 = 1$.

8. Projector of claim 1, wherein the star plates or templates are each connected to a respective support each comprising several identical support plates the identical support plates being spaced one behind the other and having boreholes parallel to the optical axis.

9. Projector of claim 1, wherein the star plates or templates are each connected to a respective support, each of said supports comprising several support plates spaced one behind the other and in each of which the the boreholes are positioned differently from the others.

10. Projector of claim 1, wherein the partially movable diaphragm is disposed directly in front of the light inlet end of the fiber optical light guide cable.

11. Projector of claim 1, wherein the respective star plates or templates are adjustably connected to at least one support plate, and the star plates or templates and the support plate are provided with boreholes of appropriate diameter representing the stars to be projected, the light emergence ends of the fiber optical light guides or fiber optical light guide bundles being fastened in the boreholes of the support plate.

12. Projector of claim 1, wherein means for attenuating the light are provided in the fiber optical light guides or guide bundles.

13. Projector of claim 1, wherein the support plate has a plano-convex shape, the convex surface facing the light source and the axis of the boreholes in the support plate being directed to a point lying in the lens.

* * * * *